June 14, 1938. R. W. BABSON Re. 20,764
PARKING METER
Original Filed Jan. 11, 1930 2 Sheets-Sheet 1
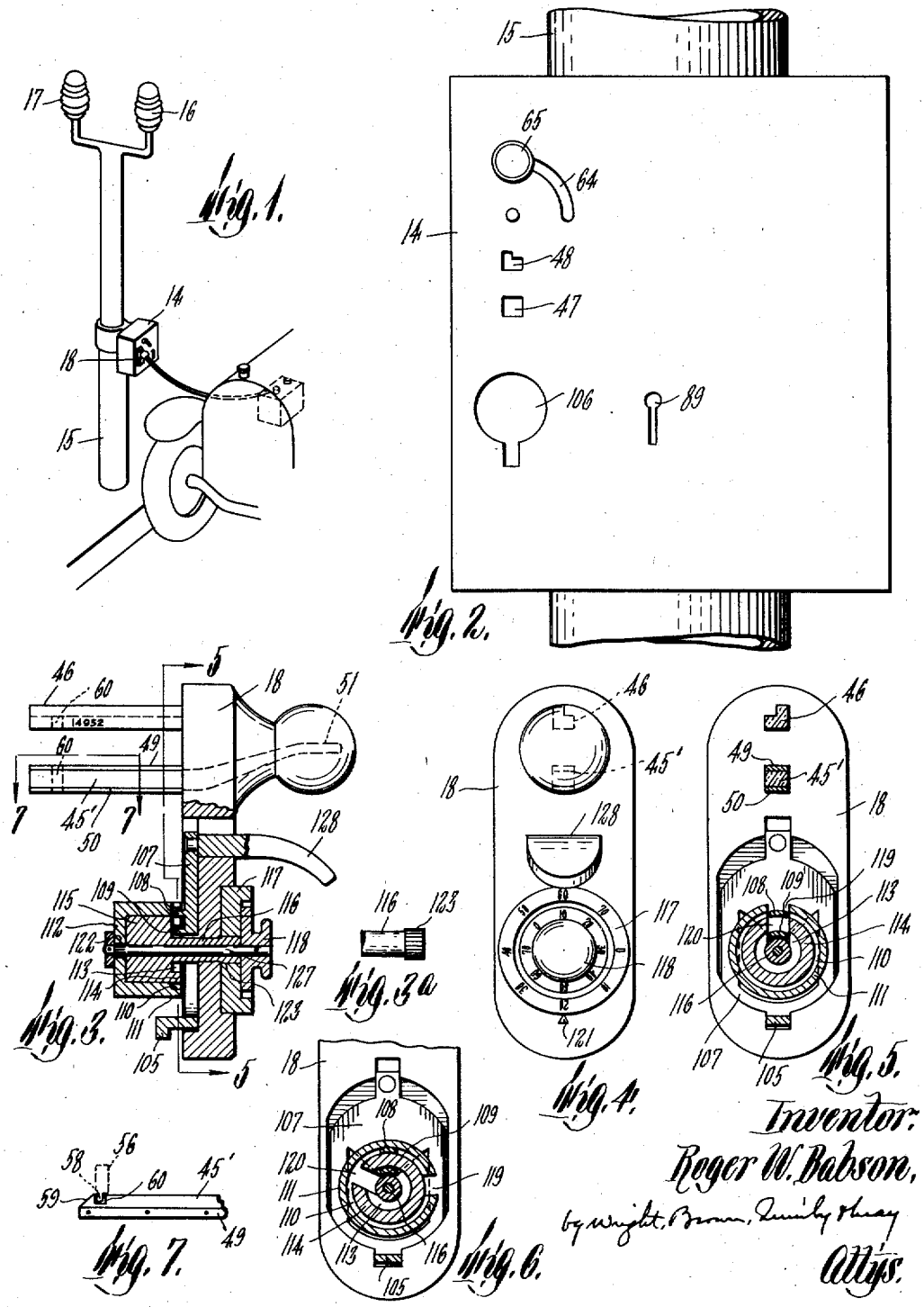
Inventor:
Roger W. Babson,
by Wright, Brown, Quinby & Huey
Attys.

June 14, 1938. R. W. BABSON Re. 20,764
PARKING METER
Original Filed Jan. 11, 1930 2 Sheets-Sheet 2
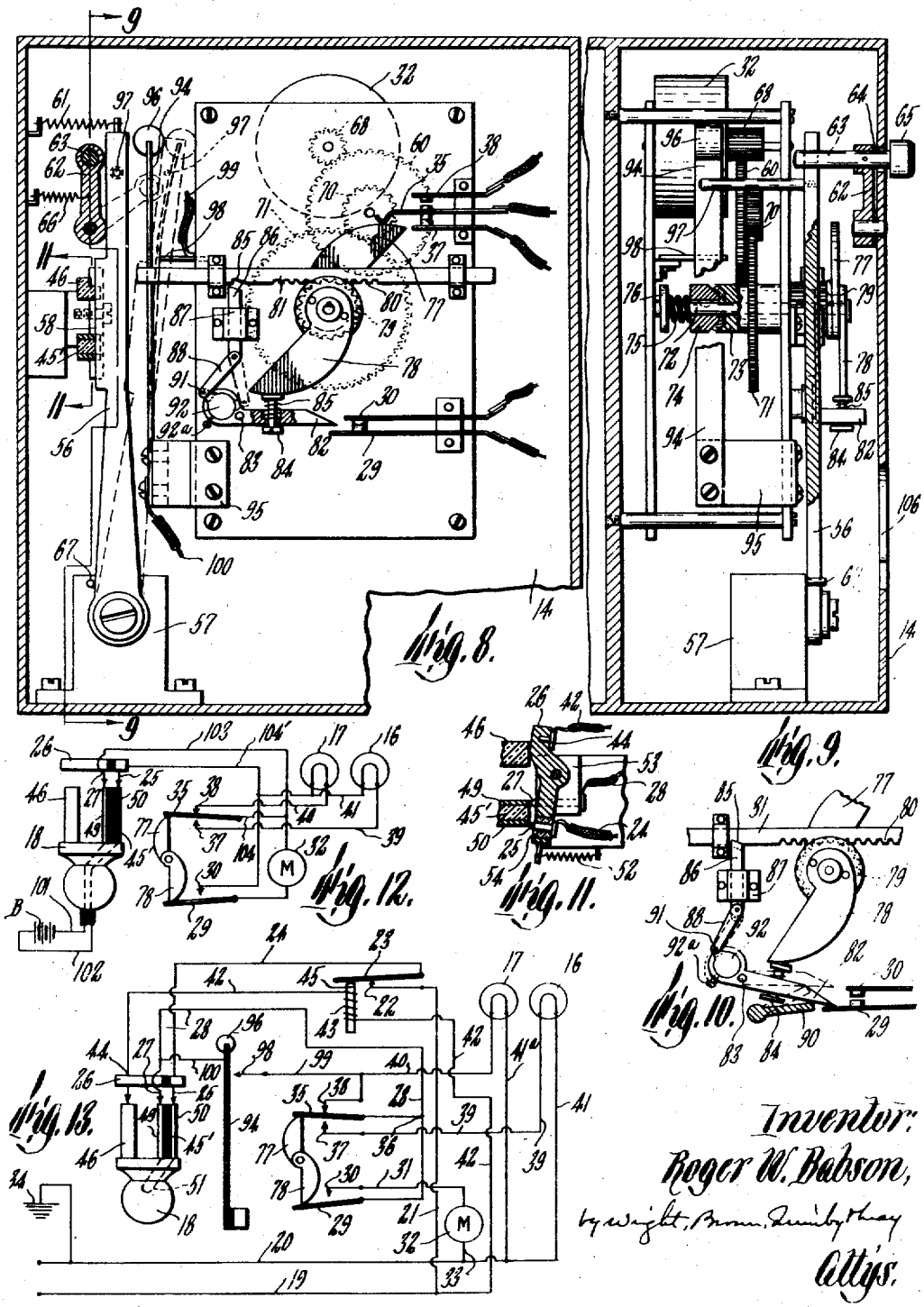
Inventor:
Roger W. Babson,
by Wright, Brown, Quinby & Clay
Attys.

Reissued June 14, 1938

Re. 20,764

UNITED STATES PATENT OFFICE 20,764

PARKING METER

Roger W. Babson, Wellesley, Mass.

Original No. 1,965,066, dated July 3, 1934, Serial No. 420,270, January 11, 1930. Application for reissue July 1, 1936, Serial No. 88,415

25 Claims. (Cl. 177—311)

The object of the present invention is to provide an apparatus or means for use in connection with automobiles parked at the sides of public streets, to indicate prominently and in a readily distinguishable manner when a car has remained parked beyond the prescribed limit of time. It is useful also for analogous purposes in analogous situations, wherefore the above mentioned specific use is to be understood as illustrative and not limiting of the scope of protection which I claim. In this understanding I will proceed with the explanation of the invention, its purposes and advantages, as related primarily to the particular use mentioned.

It is well known that parking of automobiles on the busy streets of the larger cities is a serious problem and a detriment to traffic and mercantile business. Most municipalities limit such parking, by ordinance or police regulation, to definite periods of time, and penalize automobile owners who overstay such limits. The enforcement of these regulations is difficult and requires close oversight by a large number of police officers of the streets on which limited parking is permitted.

In a prior patent dated October 15, 1929, No. 1,731,839, I have disclosed one solution of the problem, by requiring the motorist who has overstayed his free parking time to make payment of an amount of money proportional to the length of overstay before he can remove the car, thus providing a revenue to the city for use of the streets as a parking space. By the present invention I have provided another solution of the same problem, which does not necessarily, although it may, require payment of money by the overtime parker, but does greatly simplify the task of supervision by the police officers over areas on which limited parking is permitted. In its main essentials, it comprises a conspicuous signal, preferably lights in different colors, one of which is caused to show when the automobilist parks his car in the permitted area, and the other of which is automatically caused to show after lapse of a predetermined time. It further includes mechanism for controlling these signals, and accessory devices, all of which are explained in the following description of a concrete embodiment of the invention.

In the drawings,—

Fig. 1 is a perspective view showing part of a parked automobile adjacent to a signal post on which the signals and controlling means therefor are mounted;

Fig. 2 is an elevation of the box or casing containing the signal controlling mechanism of the invention, together with a fragment of the post on which it is mounted;

Fig. 3 is a partial side elevation and partial section of a plug or connector in the possession of the car owner, by which the signal controlling means is put in operation;

Fig. 3*a* is a fragmentary elevation of a detail of such connector;

Fig. 4 is an elevation of the same plug or connector as seen from the right of Fig. 3;

Fig. 5 is a sectional view of the same taken on line 5—5 of Fig. 3;

Fig. 6 is a view similar to Fig. 5 showing the lock of the connector in a different position from that shown in Fig. 5;

Fig. 7 is a fragmentary plan view of the parts below line 7—7 of Fig. 3;

Fig. 8 is a vertical section through the box containing the control mechanism, showing parts of such mechanism in elevation and other parts in section;

Fig. 9 is a cross section on line 9—9 of Fig. 8;

Fig. 10 is a fragmentary elevation of a locking device associated with the signal controlling mechanism;

Fig. 11 is a fragmentary sectional view, taken on line 11—11 of Fig. 8, of a circuit closer actuated by the motorist's plug or connector and cooperating therewith to complete the electric circuit through the signal lights and motor;

Fig. 12 is a diagram of the electrical circuits of the device organized to receive power from the battery of the automobile;

Fig. 13 is a diagram of the circuit used when current is supplied from the electric light service line of the community, or other source outside of the automobile battery.

Like reference characters designate the same parts wherever they occur in all the figures.

Describing now the particular apparatus here shown, as illustrative of the principles of the invention, without implying limitation thereof to this specific device, I will take, first, the case in which power is derived from the electric lighting service, the electrical diagram of which is shown in Fig. 13. The controlling mechanism is contained in a box 14 mounted on a post 15, of any suitable character, erected beside the curb, sidewalk curb, or elsewhere adjacent to any space in which parking is permitted, on which are mounted in a prominent position signals 16 and 17.

Preferably these signals are differently colored lights, and it may be assumed that 16 is a green light and 17 a red light, surrounded by lenticular glasses which direct the rays horizontally. The automobile driver, upon bringing his car to rest beside the post, inserts a plug or connector 18 in orifices provided for its reception in the front wall or cover of the box 14. The inserted plug completes the electric control circuits of the apparatus. Attention is called to Fig. 13 for an explanation of the electric circuits, and to Fig. 11 for illustration of a preferred circuit closer. The wires of the power line are designated 19 and 20. A conductor 21 leads from a connection with the positive side 19 of the power line to one of the contacts 22 of a break switch 22, 23, the other contact of which is coupled by a conductor 24 with a contact member 25 carried by a circuit closer lever 26 and adapted to be engaged by the motorist's inserted plug 18. A stationary contact 27, also adapted to be engaged by the inserted plug is connected to a conductor 28 which leads to a second break switch 29, 30 in a circuit 31 leading to a motor 32. The latter is connected electrically with the return side 20 of the power line, either by a direct conductor 33 or by being grounded on the case 14, on which also the return line is grounded, as indicated at 34, for a purpose later described.

The motor may be any sort of electric motor suited to the available current and capable of running at a substantially uniform rate. In situations where alternating current is available, I prefer to use a self starting synchronous motor of a type now well known and obtainable in the open market.

The movable circuit closing member 35 of a two-way switch is connected to receive current from the line under control of the circuit closer 25, 27, preferably being joined to the conductor 28 at any suitable point 36. Complemental contacts 37 and 38 are arranged to be engaged alternately by the member 35 in its different positions. The contact 37 is connected by a conductor 39 with the green light 16, and the contact 38 is connected by a conductor 40 with the red light 17. Connections between these lights and the return side of the line are indicated at 41 and 41a, and may be separate wires, a single wire, in part, or the casing itself. A shunt circuit conductor 42 from the line 19 contains a solenoid coil 43 and leads to an electrical connection at 44 with the circuit closing lever 26. The core 45 of the solenoid is arranged in such proximity to the break switch arm 23 that, when the solenoid is energized, it displaces said arm and breaks the circuit through that switch.

These circuits are controlled by the inserted plug or connector 18 as follows. The body of this connector is of non-conductive material and has two parallel prongs 45' and 46 suitably spaced and formed to match the openings 47 and 48, respectively, in the outer wall of the case. Both prongs are of insulating material, but the prong 45' carries conductive material in position to engage simultaneously with the contacts 25 and 27 when the connector is inserted, and when the lever 26 is moved by the prong 46 into the position shown in Fig. 11. As here shown, the conductive material carried by prong 45' consists of two metal strips 49 and 50 secured to opposite sides of the prong and mechanically separated by the non-conducting substance of the prong but electrically connected in any suitable way. In Fig. 13 the electrical connection is indicated as a conductor 51 embedded in the body of the connector. However, the conductive bridge may be otherwise arranged in any desired suitable way so far as the embodiment of the invention now being considered is concerned. But the arrangement of the conductors 49 and 50 here shown is preferred, because it enables the same design of plug to be used in the case where current for operating the electrical apparatus is derived from the battery of the automobile, as will be presently described.

The lever 26 is connected with a spring 52 so that the contact 25 tends to be retracted from the inserted position of the conductor 50 and the opposite arm of the lever to be advanced toward the entrance opening for the prong 46. When the proper connector is inserted, the prong 46 thereof first engages and pushes back the advanced arm of lever 26, pushing forward the arm which carries the contact 25 until the latter is brought into engagement with the conductor 50 at the instant when the connector is fully inserted and the conductor 49 comes into engagement with the stationary contact 27. The latter contact and the metallic lever 26 are mounted on a support 53 of insulating material, and the contact 25 is insulated from the lever by a bushing 54. Conductor 42 is in metallic conducting connection with the body of lever 26.

This organization of the circuit closing means is designed to prevent operation of the system by anything except an authorized connector. A metal rod or the like inserted through the opening 47 cannot make simultaneous engagement with the contacts 25 and 27 except when the lever 26 is simultaneously moved by another body inserted through the opening 48. If an instrument such as a screw driver, nail, wire, etc. which may be convenient to the car owner's hand is used thus to move the lever, it completes the circuit containing solenoid 43 and causes the switch 23 to be opened, thus breaking the operating circuits of the motor and signal lamps. The complete circuit in which the solenoid is contained includes an electrical connection between the line wire 20 and a conductive part of the case, indicated in the diagram as a ground 34, with which the above mentioned inserted instrument must inevitably come in contact when brought into contact with the lever, or at least when braced against the case to hold the lever in the operative position (Fig. 11).

Mechanism is contained in the case for locking the connector when inserted and for changing the circuits of the signal lights at the end of the prescribed parking time limit. A latch lever 56 is pivoted on a support 57 in the case and has an edge or lip 58 arranged to be displaced by the beveled end faces 59 (Fig. 7) of the inserted connector prongs and to enter notches 60 in the side of the prongs under the influence of a spring 61. An operating lever 62 is pivoted to the front wall of the case and carries a pin 63 extending to front and rear. The rear end of this pin overlaps the latch lever and its forward end passes through a curved slot 64 in the front wall, concentric with the axis of the operating lever, and carries a knob or handle 65. A spring 66 normally holds the operating lever in its upright position, where it leaves the latch lever free to engage the connector prongs, while movement of the operating lever to the right with respect to Figs. 2 and 8 releases the latch lever from the prongs. A stop pin 67 on the supporting block arrests the latch lever in the position first described.

The motor 32 drives a gear train 68, 69, 70, 71 with a speed reduction such that the gear 71 turns at any desired relatively slow rate, for example, at the rate of once per hour or once in two hours, once in half an hour, or whatever rate may be suited to the established parking limit.

The gear 71 is loose on a shaft 72 and its hub 73 forms one member of a friction clutch, the other member 74 of which is splined on shaft 72 and pressed firmly against the member 73 by a spring 75 which reacts against a collar 76 on the shaft. This shaft carries on its forward end cam members 77, 78, and a gear pinion 79. The pinion meshes with rack teeth 80 on a bar 81 which serves as an obstructor for the latch and is mounted in guides so as to move endwise toward and away from the latch lever 56 in the same plane therewith.

The cam member 77 is arranged to act on the previously described switch lever 35, which is either itself a spring, or is spring influenced, so that as the cam member rotates in a counterclockwise direction (with respect to Fig. 8, it eventually raises said switch lever from its normal position of engagement with contact 37 to an engagement with contact 38; thus extinguishing the green light and illuminating the red light. The other cam member 78 acts on a lever 82, pivoted at 83 and arranged to overlap the end of switch arm 29, which also may be either a spring or a spring influenced arm and is normally in engagement with contact 30. The engagement of cam 78 with lever 82 is made through a pin 84 which is movable endwise through the lever and is yieldingly urged toward the cam by a spring 85; this yielding means being provided to permit operation by the same lever of the later described lock for the rack bar 81.

The bar 81 is advanced simultaneously with the rotation of the cam members, and when the latter arrive in the position for shifting the switch arms 35 and 29, the advancing end of the bar approaches close to the latch lever 56, within a distance less than that through which the adjacent part of such lever must be moved when unlocking the inserted connector prongs. At the same time a notch 85 arrives in position to receive the end of a lock bolt 86 which is movable endwise in a guide 87 and is connected by a link 88 with that arm of lever 82 which lies at the opposite side of pivot 83 from the part which engages the cam. Depression of the lever thus raises the bolt and locks the bar 81 against retraction at the same moment when the switch 29 is opened. It will now be apparent that the spring 85 allows the cam to continue rotating after coming to bear on pin 84 and stores power while the bolt bears on the under side of bar 81, ready to project the bolt as soon as the notch 85 arrives in receiving position, and at the same time open the switch 29 and stop the motor, as shown in Fig. 10.

In this condition the latch lever 56 is obstructed so that it cannot be moved to release the inserted connector. Release is then possible only by means of a key in the possession of the officer on duty at the locality. A key hole 89 is provided in the front wall of the casing to admit a key 90 (Fig. 10) in position to engage the under side of lever 82 and raise it, withdrawing the bolt 86. The spring 85 yields to permit such action even though the cam then obstructs the pin 84. Thereafter the unlocking movement given to the latch lever by means of the operating lever 62 swings the latch lever to the right and resets the obstructing bar and cams in their starting position, the friction clutch permitting the cam carrying shaft 72 to be thus turned without turning the motor.

At any time prior to the taking effect of the locking bolt, the car owner may release his connector by simply turning the operating lever, without assistance from a police officer. The lock controlled by the latter, although a valuable adjunct by reason of its effectiveness in requiring the motorist to report his own infraction of the parking regulations, is not an absolute essential and may be dispensed with in some situations. In order that the same apparatus may be used either with or without such a lock, I have provided a simple means for making it effective or ineffective at will. For this purpose a wrist pin 91 through which link 88 is connected to the lever, is provided on an extension from a pin or disk 92 rotatably mounted in a bearing in the lever so that the wrist pin can be shifted to positions more or less remote from the pivot 83 and from bar 81, or between positions on opposite sides of such pivot. With the parts proportioned as shown in these drawings, movement of the wrist pin from the full line to the dotted line position of Fig. 8 brings it approximately in line with the bolt and close to the lever pivot 83, whereby normal movement of the lever produces no movement of the bolt. With the parts otherwise proportioned, and in a similar adjustment, the normal movement of the lever may shift the bolt less than enough to lock the bar, or even withdraw it further from the bar. Pin 92 is secured in its adjustment by suitable means, as a set screw 92*a*.

I have shown here a key of the simplest possible character for unlocking the bolt, in order to explain the principles of the invention with the least avoidable complication; but it will be understood that any suitable safeguards of known character may be provided to prevent picking of the lock or unlocking it by anything but a particular authorized key.

I have provided also a safeguard to prevent the car owner from extending the parking time by releasing the connector and immediately coupling it again. I have explained above that when the operating handle 65 is turned to the right, it causes the time mechanism to be reset at the starting point. In the absence of any preventive means, this would enable the car owner to obtain unlimited parking time by resetting the apparatus at intervals slightly shorter than the permitted parking time. The device here shown for preventing this, which is one of various means which may be utilized for the purpose, consists of a spring 94 secured at its lower end to a supporting block 95 of insulating material and carrying on its upper end a weight 96 of such mass that it has a relatively slow rate of vibration. This loaded spring is of such length and flexibility that when set into vibration it will continue vibrating for a considerable time. It crosses the path of a pin 97 carried by the latch lever 56 so that the latter, when moved by the operating lever, deflects the spring, somewhat as shown by dotted lines in Fig. 8. A stop 98 is mounted in a stationary position to be engaged by the spring at a point between the fixed end of the latter and the point at which it is engaged by the pin 97, so that when thus deflected the spring is bent somewhat around the stop. This stop is insulated from the supporting structure and is connected electrically by a conductor 99 with the circuit of the red signal light, the spring meanwhile being connected by a conductor 100 with the contact 27 of the circuit closer, and thus with the current supply line 19. Thus when the operating lever 62 is swung over and released, the spring is set into vibration and strikes the stop 98 several times in succession. If the connector plug is left in the box meanwhile, the red signal light is illuminated several times in succession, calling the attention of the officer on watch to what is being done. But if the motorist is merely releasing the plug preparatory to going away, he withdraws it as soon as it is released and the consequent breaking of the lamp circuit prevents the red light from flashing. It is possible by this means to cause repeated contact between the spring and the stop 98 over a period of several minutes, that is, for a time slightly less than that needed for a person to withdraw his car from the parking space and for another driver to place his car in the vacated space and insert the connector plug. The object sought and accomplished is to prevent unauthorized extension of the parking time by one person, but in such a way as will permit another car to be parked in a recently vacated space, without causing the red light to show.

In the case where current to operate the lights and the time mechanism is derived from the battery of the parked car, the conductive strips 49 and 50 on one of the prongs of the connector plug are separately connected by two conductors 101 and 102 with the battery B, as shown in Fig. 12. The locking means, motor driven mechanism, and switches for changing the lights and stopping the motor are or may be the same as previously described, but the accessories provided as safeguards when current is taken from the service line are omitted. A conductor 103 leads from one of the circuit closer contacts to the motor, with a branch 104 to the light changing switch. The return side of the motor is connected through the break switch 29 with the conductor 104' leading to the other contact of the circuit closer, with which also the return leads of the signal lamps are connected. For the rest, the parts in Fig. 12 corresponding to those shown in the other figures are designated by the same reference characters.

In this case a physical connection by means of the cable exists between the connector and the automobile, and the cable may be heavily armored to make difficult its being broken or cut by a motorist who has overstayed the time limit and wishes to depart without making himself known. A similar mechanical connection may also be made between the car and the connector by a steel tape or the like in the case where electrical power is supplied from a source external to the car. However, my invention includes a provision for licensing and registration by the municipal or State authorities of the connectors possessed by all automobile owners. Each plug therefor is stamped or marked with the license identification, as indicated by the numerals appearing on the prong 46 in Fig. 3. Such designation then identifies the car owner who, having overstayed the time limit and found his connector locked in the box, has departed without notifying the officer on post; and it dispenses with the need of any physical connection between the car and the connector except in the case where the signal is operated by current taken from the car.

It is desirable that the connector, once applied to the signal post should be locked thereto by a lock in the exclusive control of the licensed owner in order to prevent its theft and use by an unlicensed person. I have disclosed a suitable owner controlled lock in connection with the connector illustrated in Figs. 3–6. The particular lock so illustrated is a keyless combination lock, the advantages of which are obvious, although a key operated lock may be equally well used within the scope of the invention.

Describing that here shown, the connector is formed with a body portion of suitable extent on the side of which that comes next to the casing is a latch 105 adapted to be passed through a hole 106 in the wall of the casing and to hook over the lower edge of the hole. This latch is carried by a slide 107 to which is connected a handle 128. The slide is provided with two prongs or fingers 108 and 109. The finger 108 occupies a groove 110 surrounded by a rib 111 on the end of a cylindrical cup 112, and the prong 109 occupies a similar groove 113 surrounded by a rib 114 on the end of a plug 115 which fits rotatably within the cup 112. Plug 115 has a tubular stem 116 which passes through the connector body and is coupled with a disk 117 on its outer end. The cup 112 is coupled to a rod 127 which passes through the tubular stem 116 and on the outer end of which is secured a knob 118. A notch 119 is formed in the rib 111 at one side of the cup 112, just wide enough to pass the prong 108 when alined with the prong, and a similar notch 120 is formed in the rib 114. The knob 118 and disk 117 are provided with dials, the indications of which, when properly placed beside an index 121, inform the person who knows the combination when the notches are in position to permit retraction of the latch slide. A wide variety of different combinations is obtained by securing the dials in different angular relationships with the respective notches. Such placements and changes of combination are made readily possible by providing the rod 127 with teeth or serrations 122 complemental to teeth surrounding the hole in the end wall of the cup through which the rod passes, and by providing the stem 116 with teeth or serrations 123 on its end complemental to serrations in the hole wherein it is received in the disk 117. An obvious extension of this principle by providing additional cups and dials enables the lock to be made still more difficult to be unlocked by a thief. This lock, although simple in the extreme, is most effective, for the latch cannot be retracted until both or all of the notches 119, 120 (and any others which may be added) are in register at the same time with the path of movement of the prongs, and there are no tumblers to indicate by sound when the notches are thus registered.

The outermost cup of the lock combination projects from the inner side of the connector body plate, and the hole 106 is made of the right size and shape to receive it. The slide 107 occupies a guideway in the inner side of the body plate and is centrally slotted to embrace the stem 116, since the latch 105 and the handle 128 are on opposite sides of such stem. However, various modifications and rearrangements of these parts may be made within the scope of the invention. The same lock may be used to secure the connector in a receptacle in the car and prevent its theft when not coupled with the parking indicator. It is not intended to take the place of the lock first described, release of which requires cooperation of an officer, but is an adjunct for the protection of the licensed owner during such times as the connector is free of the time lock.

The apparatus of this invention is primarily an aid to municipal authorities in enforcing parking regulations. Where installed for that purpose, its use by automobile parkers is, by law or regulation, made compulsory. A number of devices or apparatus such as described may be placed contiguous to all spaces or berths in which limited parking is permitted, whether the cars so parked are placed alongside or diagonal to the curb. Exhibition of a red light by the signal adjacent to any car shows the officer on post at once that the motorist has overstayed the time, and eliminates the difficult and uncertain methods now used of identifying overtime parkers. Absence of any light at all beside the berth occupied by a car shows that the owner has failed to comply with the law and is subject to investigation; while the presence of a green light shows that the car is legally parked. All difficulty of identification of illegally parked cars among a large number in a given area is thus completely eliminated.

Of course the principles of the invention may be embodied in many diverse constructions and forms, both as to the signals themselves and the controlling means and mechanisms. For instance, in order to economize consumption of current, the signals, instead of being constantly glowing lamps, may be devices in the nature of targets or flags which are moved into different positions, or different ones of which are brought into a given position, automatically after lapse of time, by the controlling means. And instead of using an electric motor as the prime mover of the control mechanism, I may use a spring motor which is wound and reset with each release of a connector and put into action by insertion of a connector. What I mean to express by these suggestions is that the invention is generic in its broader aspects, and that I claim a wide range of equivalents within the scope of the protection here sought; while at the same time claiming specifically the illustrative embodiment shown.

What I claim and desire to secure by Letters Patent is:

1. A parking indicator comprising two electric indicating signals adjacent to a parking berth, a separate connector, circuit closing means operable by application of said connector for actuating one of said signals, and electrically driven signal changing means, normally inoperative and set in operation by application of said connector for discontinuing the before specified signal and operating the other signal after lapse of a given time interval.

2. A parking indicator comprising a support adjacent to a parking berth, a separate connector applicable to and removable from said support, distinctive electric signals mounted on the support, an electric motor mounted on the support, a circuit changing switch normally in circuit connection with one of said signals exclusively in an otherwise normally open circuit and adapted to be shifted into exclusive circuit connection with the other signal, switch shifting mechanism driven by said motor, and circuit closing means operable by the applied connector for closing the circuits of both the said motor and signals.

3. A parking indicator comprising a support adjacent to a parking berth, a separate connector applicable to and removable from said support, distinctive electric signals mounted on the support, an electric motor mounted on the support, a circuit changing switch normally in circuit connection with one of said signals exclusively in an otherwise normally open circuit and adapted to be shifted into exclusive circuit connection with the other signal, means for shifting said circuit changing switch after lapse of a predetermined time driven by said motor, circuit closing means operable by the applied connector for closing the circuits of both the said motor and signals, a normally releasable retaining latch for said connector, and locking means operable by said motor simultaneously with the shifting of said switch for preventing release of said latch.

4. A parking indicator comprising a support adjacent to a parking berth, a separate connector applicable to and removable from said support, distinctive electric signals mounted on the support, an electric motor mounted on the support, a circuit changing switch normally in circuit connection with one of said signals exclusively in an otherwise normally open circuit and adapted to be shifted into exclusive circuit connection with the other signal, means driven by said motor for shifting said switch at a given time after starting of the motor, circuit closing means operable by the applied connector for closing the circuits of both the said motor and signals, a normally releasable retaining latch for said connector, locking means operable by said motor at the same time with the shifting of said switch for preventing release of said latch, and key controlled means for unlocking said locking means and permitting subsequent release of the latch.

5. A parking indicator adjacent to a parking berth comprising electric signals in separate circuits, a change switch in a normally open circuit for closing the circuit to one or the other of said signals exclusively, an electric motor, a break switch in the circuit of said motor, a connector for closing the electric supply circuit to said signals and motor, and mechanism driven by the motor for shifting the change switch and opening the break switch after lapse of a predetermined time interval from the application of said connector.

6. A parking indicator comprising electric signals in separate circuits, a change switch for closing the circuit to one or the other of said signals exclusively, an electric motor, a break switch in the circuit of said motor, a connector for closing the electric supply circuit to said signals and motor, mechanism driven by the motor for shifting the change switch and opening the break switch after lapse of a predetermined time interval from the application of said connector, an automatic intermittent circuit closer for one of said signals, and means for setting said intermittent circuit closer into action when the connector is released.

7. A parking indicator comprising electric signals in separate circuits, a change switch for closing the circuit to one or the other of said signals exclusively, an electric motor, a break switch in the circuit of said motor, a connector for closing the electric supply circuit to said signals and motor, mechanism driven by the motor for shifting the change switch and opening the break switch after lapse of a predetermined time interval from the application of said connector, a releasable latch for securing the connector in applied position, intermittent circuit closing means for one of said signals, and means whereby withdrawal and return of said latch puts said intermittent circuit closing means into operation.

8. A parking indicator comprising two electric signal lights of different colors mounted in a visible position adjacent to a parking berth, circuits for conducting electric current to said signal lights including a changeable switch adapted to be placed in either of two positions wherein respectively it directs current exclusively to one signal or the other, said changeable switch being normally in position to illuminate one of said signals, an electric motor, a timing member driven by said motor having means for shifting said changeable switch from the normal to the other of said positions when the timing member arrives at a given point in the course of its driven travel, a normally open main switch in the supply circuit to said changeable switch and said electric motor, and a connector associated with a parked automobile removably cooperative with said main switch for completing said circuits.

9. An automobile parking indicator comprising an electric signal light, a normally open switch in the circuit to said light, an electric motor, a timing member driven by said motor organized to close said switch at a given point in the course of its motor driven travel, a connector associated with a parked automobile, and circuit closing means with which said connector is detachably cooperable for completing the current supplying circuit to said switch and said motor.

10. A parking indicator comprising a normally inoperative signal visibly mounted adjacent to a parking berth, and a control apparatus for said signal including a shiftable controller for said signal normally out of signal actuating position, a movable timing member constructed to shift said actuator into signal operating position when the timing member reaches a given point in its travel, a motor, normally at rest, for driving said timing member, a connector associated with a parked automobile connectible with said control apparatus, and means cooperative with said connector when the latter is connected to the control apparatus for starting said motor.

11. A parking indicator comprising a stationary support adjacent to a parking berth, a signal and a control apparatus for said signal mounted on said support, a connector associated with a parked automobile insertable in said control apparatus, a manually displaceable latch for securing the inserted connector, a timing member, means operated by said timing member for actuating said signal, a motor for driving the timing member, means operable by insertion of the connector for starting said motor, an obstructor for said latch and reversible driving means between said timing member and obstructor, the obstructor being shiftable by the timing member from a remote position into obstructing relation with the latch, and being retractable by manual operation of the latch into its first position, and said reversible driving connections being then operable to return the timing member to starting position.

12. A parking indicator comprising a stationary support adjacent to a parking berth, a signal and a control apparatus for said signal mounted on said support, a connector associated with a parked automobile insertable in said control apparatus, a manually displaceable latch for securing the inserted connector, a timing member, means operated by said timing member for actuating said signal, a motor for driving the timing member, means operable by insertion of the connector for starting said motor, an obstructor for said latch movable from a retracted position to an obstructing position in a path such that releasing movement of the latch returns it to the first position, and driving connections between said timing member and obstructor constructed to transmit motion from either to the other.

13. A parking indicator comprising a stationary support adjacent to a parking berth, a signal and a control apparatus for said signal mounted on said support, a connector associated with a parked automobile insertable in said control apparatus, a manually displaceable latch for securing the inserted connector, a timing member, means operated by said timing member for actuating said signal, a motor for driving the timing member, means operable by insertion of the connector for starting said motor, an obstructor for said latch, connections between said obstructor and timing member whereby the latter in its travel is adapted to shift the obstructor into obstructing relation to the latch, a lock for said obstructor, and means whereby the timing member puts said lock into locking relation with said obstructor at a given point in the travel of the obstructor.

14. A parking indicator as set forth in claim 13 and comprising further a detachable key insertable into said control apparatus for releasing said lock.

15. In a control apparatus for the purpose set forth, a driving motor, a movable timing member, driving means between said motor and timing member including a clutch adapted to slip when the timing member is moved by superior force oppositely to the direction in which it is propelled by the motor, a connector insertable into said apparatus, a manually displaceable latch for holding said connector in place, and an obstructor for said latch guided to move from retracted position to latch obstructing position in a path such that the latch, when moved to release the connector, is adapted to return the obstructor to previous position, and gearing between the timing member and obstructor operable to shift the obstructor when the timing member travels in its motor driven direction, and to return the timing member to starting position when the obstructor is moved by retractive movement of said latch.

16. A parking indicator comprising a signal visibly mounted adjacent to a parking berth, control mechanism for said signal comprising a motor normally at rest, a timing member coupled with said motor to be driven thereby, and a signal actuator arranged to be placed by said timing member in signal actuating position when the timing member arrives at a given point in its movement, a connector associated with a parked automobile and detachably engageable with said control apparatus, means operated by such engagement for starting said motor, and means operated by the timing member for stopping the motor when said actuator is in such signal actuating position.

17. A parking signal indicator comprising a visible signal adjacent to a parking berth, a control apparatus for said signal, a connector associated with a parked automobile detachably applicable to said control apparatus, a motor, means cooperating with said connector for starting the motor, means operated by the motor for causing a continued actuation of the signal, and means operable on withdrawal of the connector for causing an intermittent actuation of said signal.

18. A parking indicator comprising electric signal means adjacent to a parking berth, a connector associated with a parked automobile, control apparatus having provisions for reception detachably of said connector, circuit closing means for the signal adapted to be closed when the connector is applied and to be opened when the connector is withdrawn, intermittent circuit closing means for said signal, and means for setting said intermittent circuit closing means into action.

19. A parking indicator as set forth in claim 18, and in which the intermittent circuit closer comprising a vibratory spring and a complemental contact member normally separated therefrom, and actuating means therefor, consists of a displaceable retaining latch for the connector arranged to displace and flex said vibratory spring.

20. A support adjacent to a parking berth for automobiles, a separate connector associated with the parked automobile applicable to and removable from said support, a latch for engagement with the applied connector for preventing its removal, said latch being manually releasable, a substantially synchronously running motor on said support, being normally inactive, means for starting said motor by application of the connector to the support, a latch obstructor driven by said motor from a position withdrawn from the latch into another position wherein it obstructs the connector-releasing movement of the latch, said obstructor being located and movable in a path such that the movement of the latch in releasing the connector returns the obstructor to its first named position, a lock for preventing retractive movement of the obstructor and means controlled by the motor for actuating said lock when the motor has run for a predetermined length of time.

21. The combination of a stationary support adjacent to an automobile parking berth, a connector associated with an automobile parked in such berth insertable in said support, a manually displaceable latch for securing the inserted connector, a timing means, a normally inactive motor for driving said timing means, means operable by insertion of the connector for starting said motor, an obstructor for the latch, connections between said obstructor and timing means whereby the latter in its travel shifts the obstructor from non-obstructing into obstructing relation to the latch, a lock for said obstructor, and means whereby the timing means puts said lock into locking relation with the obstructor at a given point in the travel of the obstructor.

22. The combination of a stationary support adjacent to an automobile parking berth, a connector associated with an automobile parked in such berth insertable in said support, a manually displaceable latch for securing the inserted connector, a timing means, a normally inactive electric motor, connections including a friction clutch by which said motor drives the timing means, means for closing the circuit of the motor to start the same upon insertion of the connector, a latch obstructor in geared connection with the timing means to be driven thereby into latch obstructing position from a non-obstructing position and being retractable by the latch when the latter is moved to release the connector, a circuit interrupter in the circuit of said electric motor, a lock for preventing retraction of the obstructor, and means whereby said timing means puts said lock into locking relation with the obstructor at a given point in the travel of the obstructor, the last named means being further organized to operate said circuit interrupter so as to stop the motor.

23. A parking indicator comprising a standard mounted adjacent to a parking berth, a changeable visible signal and a casing mounted on said standard, the casing having an inlet for a connector member, timing means in the casing, means operable through the agency of a connector member inserted by the operator into said inlet for putting said signal in one indicating condition and setting the timing means in action, and means controlled by the timing means for changing the signal to a different indicating condition after lapse of a predetermined time.

24. A parking meter comprising a casing, a timing means and a motor within said casing, the motor being in driving connection with the timing means to impart motion thereto at a prescribed speed and being normally stationary, a signal visible from outside of the casing and changeable between one and the other of two conditions, in one of which it indicates present duration, and the other expiration, of a limited parking time, a connector member insertable into the casing, means operable solely by the connector when inserted for causing the motor to be started, and for putting the signal in the first of the before-named conditions, and means whereby the timing means puts the signal in the second of said conditions after lapse of time.

25. A parking indicator in fixed location adjacent to a parking berth comprising, in combination, a signal changeable between one condition which indicates present duration, and another condition which indicates expiration, of a prescribed parking time, a casing having an inlet for insertion of a connector member, timing apparatus in the casing including means for causing change of the signal from the first to the second of the above named conditions, and means located in the casing for operation by such a connector member when inserted in said inlet for putting said timing apparatus into action.

ROGER W. BABSON.